US012037927B2

(12) United States Patent
Mizumi et al.

(10) Patent No.: US 12,037,927 B2
(45) Date of Patent: Jul. 16, 2024

(54) TURBINE STATOR VANE AND STEAM TURBINE

(71) Applicant: MITSUBISHI HEAVY INDUSTRIES, LTD., Tokyo (JP)

(72) Inventors: Shunsuke Mizumi, Tokyo (JP); Soichiro Tabata, Tokyo (JP); Koji Ishibashi, Tokyo (JP); Satoshi Miyake, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/032,054

(22) PCT Filed: Mar. 30, 2022

(86) PCT No.: PCT/JP2022/015932
§ 371 (c)(1),
(2) Date: Apr. 14, 2023

(87) PCT Pub. No.: WO2023/276385
PCT Pub. Date: Jan. 5, 2023

(65) Prior Publication Data

US 2023/0392510 A1 Dec. 7, 2023

(30) Foreign Application Priority Data

Jun. 28, 2021 (JP) ................................. 2021-106944

(51) Int. Cl.
*F01D 25/32* (2006.01)
*F01D 5/14* (2006.01)
*F01D 9/02* (2006.01)

(52) U.S. Cl.
CPC ............... *F01D 9/02* (2013.01); *F01D 5/147* (2013.01); *F01D 25/32* (2013.01); *F05D 2220/31* (2013.01); *F05D 2250/294* (2013.01)

(58) Field of Classification Search
CPC . F01D 9/02; F01D 5/147; F01D 25/32; F05D 2220/31; F05D 2250/294
See application file for complete search history.

(56) References Cited

U.S. PATENT DOCUMENTS 6,004,102 A * 12/1999 Kuefner .................. F01D 5/286 416/224
10,132,178 B2 * 11/2018 Ishibashi ................. F01D 25/32
(Continued)

FOREIGN PATENT DOCUMENTS

EP 2 985 426 2/2016
JP 63-183205 7/1988
(Continued)

OTHER PUBLICATIONS

International Search Report issued Jun. 14, 2022 in corresponding International (PCT) Patent Application No. PCT/JP2022/015932.
(Continued)

*Primary Examiner* — David E Sosnowski
*Assistant Examiner* — Theodore C Ribadeneyra
(74) *Attorney, Agent, or Firm* — Wenderoth, Lind & Ponack, L.L.P.

(57) ABSTRACT

A turbine stator vane includes: a stator vane body extending in a radial direction intersecting a flow direction of steam; a recovery portion that is defined on a surface of the stator vane body, and configured to recover a liquid film flowing along the surface of the stator vane body; and a center region, which is defined on the surface of the stator vane body and includes grooves extending from an upstream side toward the recovery portion in the flow direction. Intervals between adjacent grooves decrease from the upstream side toward the recovery portion.

10 Claims, 6 Drawing Sheets

(56) References Cited

U.S. PATENT DOCUMENTS

| | | | | |
|---|---|---|---|---|
| 2007/0101719 | A1* | 5/2007 | Niizeki | F01D 5/288 60/645 |
| 2017/0167301 | A1 | 6/2017 | Fandrei, II | |
| 2022/0154585 | A1* | 5/2022 | Mizumi | F01D 5/141 |
| 2022/0381157 | A1 | 12/2022 | Mizumi et al. | |

FOREIGN PATENT DOCUMENTS

| | | |
|---|---|---|
| JP | 63-263204 | 10/1988 |
| JP | 64-80705 | 3/1989 |
| JP | 10-299410 | 11/1998 |
| JP | 2013-155725 | 8/2013 |
| JP | 2016-166569 | 9/2016 |
| JP | 2017-20443 | 1/2017 |
| JP | 2017-106451 | 6/2017 |
| WO | 2020/175533 | 9/2020 |
| WO | 2021/117883 | 6/2021 |

OTHER PUBLICATIONS

Written Opinion issued Jun. 14, 2022 in corresponding International (PCT) Patent Application No. PCT/JP2022/015932, with partial English language translation.

* cited by examiner

TURBINE STATOR VANE AND STEAM TURBINE

CROSS-REFERENCE TO RELATED APPLICATION

Priority is claimed from Japanese Patent Application No. 2021-106944 filed on Jun. 28, 2021, the content of which is incorporated herein by reference.

TECHNICAL FIELD

The present disclosure relates to a turbine stator blade and a steam turbine.

BACKGROUND ART

A steam turbine includes: a rotating shaft that is rotatable around an axis; a plurality of turbine rotor blade rows that are arranged on an outer peripheral surface of the rotating shaft at intervals in an axis direction; a casing that covers the rotating shaft and the turbine rotor blade rows from an outer peripheral side; and a plurality of turbine stator blade rows that are supported in a radial direction by an inner ring and an outer ring on an inner peripheral side of the casing. Each turbine rotor blade row has a plurality of rotor blades arranged in a circumferential direction of the rotating shaft, and each turbine stator blade row has a plurality of stator blades arranged in the circumferential direction of the rotating shaft. The turbine rotor blade row is disposed adjacent to the turbine stator blade row on a downstream side in the axis direction to form one stage. An intake port connected to an inlet pipe that takes in steam from the outside is formed on an upstream side of the casing, and an exhaust hood is formed on a downstream side. Steam generated by a boiler flows into the turbine after a pressure and a temperature thereof are regulated by a regulating valve and a flow rate thereof is regulated by a turbine inlet valve. The high-temperature and high-pressure steam taken in from the inlet pipe is converted into a rotational force of the rotating shaft by the turbine rotor blade rows after a flow direction and a speed thereof are regulated by the turbine stator blade rows.

The steam passing through the turbine loses energy as the steam goes from an upstream side to the downstream side, and the temperature (and pressure) thereof drops. In particular, a steam turbine for thermal power generation is generally composed of a high-pressure turbine, a medium-pressure turbine, and a low-pressure turbine. Two stages (a pair of a turbine stator blade row and a turbine rotor blade row) counting from the most downstream side of the low-pressure turbine provide a gas-liquid two-phase flow environment. Therefore, in the stage on the most downstream side, a portion of the steam is liquefied and exists in an air flow as fine droplets (water droplets), and a portion of the droplets adheres to a surface of the turbine stator blade. The droplets exist on the surface of the turbine stator blade from the upstream side to the downstream side, and the droplets are aggregated on the surface of the blade and grow to form a liquid film. The liquid film is constantly exposed to a high-speed steam flow. When the liquid film further grows and increases in thickness, a portion of the liquid film is torn off by the steam flow and is scattered to the downstream side as coarse droplets. Since the larger the droplet size is, the larger the inertial force is, the droplets cannot ride on the steam flow and pass between the turbine rotor blades, and collide with the turbine rotor blade. A circumferential speed of the turbine rotor blade increases toward a tip side and may exceed a speed of sound. Therefore, in a case where the scattering droplets collide with the turbine rotor blade, erosion may occur on the surface of the turbine rotor blade. In addition, the collision of the droplets may hinder rotation of the turbine rotor blade, resulting in braking loss.

Various techniques have hitherto been proposed in order to prevent the occurrence of such erosion. For example, in a steam turbine described in Japanese Unexamined Patent Application Publication No. 2016-166569, one guide groove is formed on a surface of a turbine rotor blade. It is described that by guiding droplets along the guide groove, the droplets can be prevented from flowing to a tip side of the turbine rotor blade having a high circumferential speed.

SUMMARY OF INVENTION

Technical Problem

However, restricting the flow of the droplets in the turbine rotor blade as described above does not provide a fundamental solution to erosion. Therefore, there has been an increasing demand for a technique capable of suppressing or collecting droplets in a turbine stator blade.

The present disclosure has been made to solve the above problems, and an object thereof is to provide a turbine stator blade and a steam turbine capable of suppressing or collecting droplets more efficiently.

Solution to Problem

In order to solve the above problems, a turbine stator blade according to the present disclosure includes: a stator blade body extending in a radial direction intersecting a flow direction of steam; a collecting portion formed on a surface of the stator blade body and collecting a liquid film flowing along the surface; and a central region formed on the surface of the stator blade body and formed with a plurality of first fine grooves extending from an upstream side in the flow direction toward the collecting portion, in which intervals between the first fine grooves adjacent to each other decrease from the upstream side toward the collecting portion.

Advantageous Effects of Invention

According to the present disclosure, it is possible to provide a turbine stator blade and a steam turbine capable of suppressing or collecting droplets more efficiently.

DESCRIPTION OF EMBODIMENTS

Configuration of Steam Turbine

Figure 1:
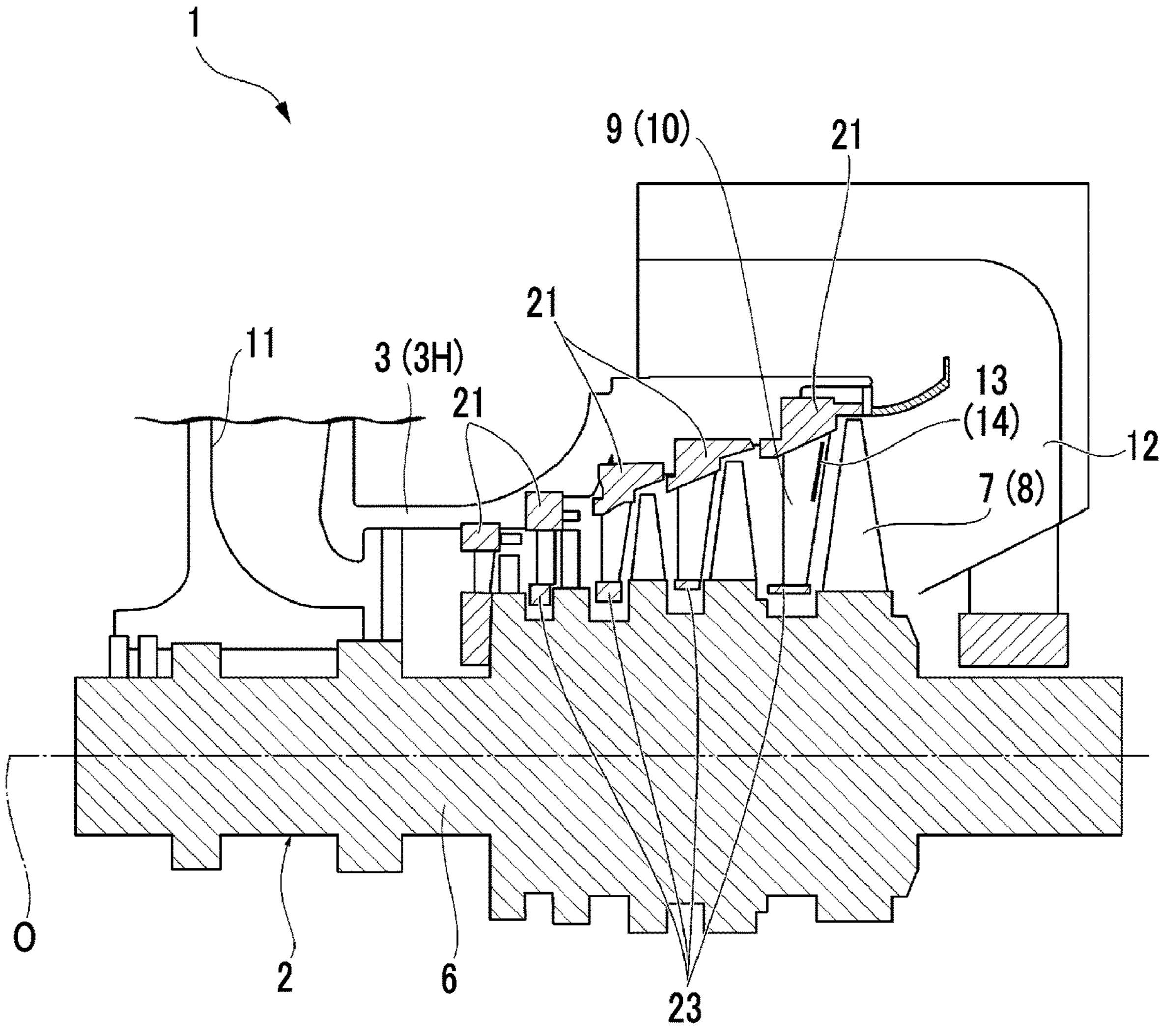
FIG. 1 is a cross-sectional view showing a configuration of a steam turbine according to an embodiment of the present disclosure.

Hereinafter, a steam turbine 1 and a stator blade 10 (a turbine stator blade) according to an embodiment of the present disclosure will be described with reference to FIGS. 1 and 2. As shown in FIG. 1, the steam turbine 1 includes a rotor 2 and a casing 3.

The rotor 2 has a rotating shaft 6 having a circular cross section extending along an axis O, and a plurality of rotor blade rows 7 provided on an outer peripheral surface of the rotating shaft 6. The rotating shaft 6 is rotatable around the axis O. The plurality of rotor blade rows 7 are arranged at intervals in an axis O direction. Each rotor blade row 7 has a plurality of rotor blades 8 arranged in a circumferential direction of the axis O. The rotor blade 8 extends radially outward from the outer peripheral surface of the rotating shaft 6. A detailed configuration of the rotor blade 8 will be described later.

The casing 3 has a casing body 3H that covers the rotor 2 from an outer peripheral side, and a plurality of stator blade rows 9 supported from the outer peripheral side and an inner peripheral side by an outer ring 21 (described later) and an inner ring 23 (described later) provided on an inner peripheral side of the casing body 3H. The casing body 3H has a tubular shape centered on the axis O. The plurality of stator blade rows 9 are arranged at intervals in the axis O direction. The steam turbine 1 includes the same number of rotor blade rows 7 as the stator blade rows 9, and one rotor blade row 7 is located between a pair of the stator blade rows 9 adjacent to each other in the axis O direction. That is, the rotor blade rows 7 and the stator blade rows 9 are alternately arranged in the axis O direction. One stator blade row 9 and one rotor blade row 7 form one "stage". Each stator blade row 9 has a plurality of stator blades 10 arranged in the circumferential direction of the axis O. The stator blade 10 extends in a radial direction with respect to the axis O.

A steam flow path 11 for taking high-temperature and high-pressure steam guided from an inlet pipe into the stage of the casing body 3H is formed on one side of the casing body 3H in the axis O direction. An exhaust hood 12 responsible for collecting a pressure of the steam is provided on the other side of the casing body 3H in the axis O direction.

The steam that has flowed into the steam flow path 11 flows through the stages in the casing body 3H, then passes through the exhaust hood 12, and is sent to a condenser (not shown). In the following description, a side on which the steam flow path 11 is located as viewed from the exhaust hood 12 will be referred to as an upstream side in a flow direction of the steam. A side on which the exhaust hood 12 is located as viewed from the steam flow path 11 is referred to as a downstream side.

Configuration of Rotor Blade

Figure 2:
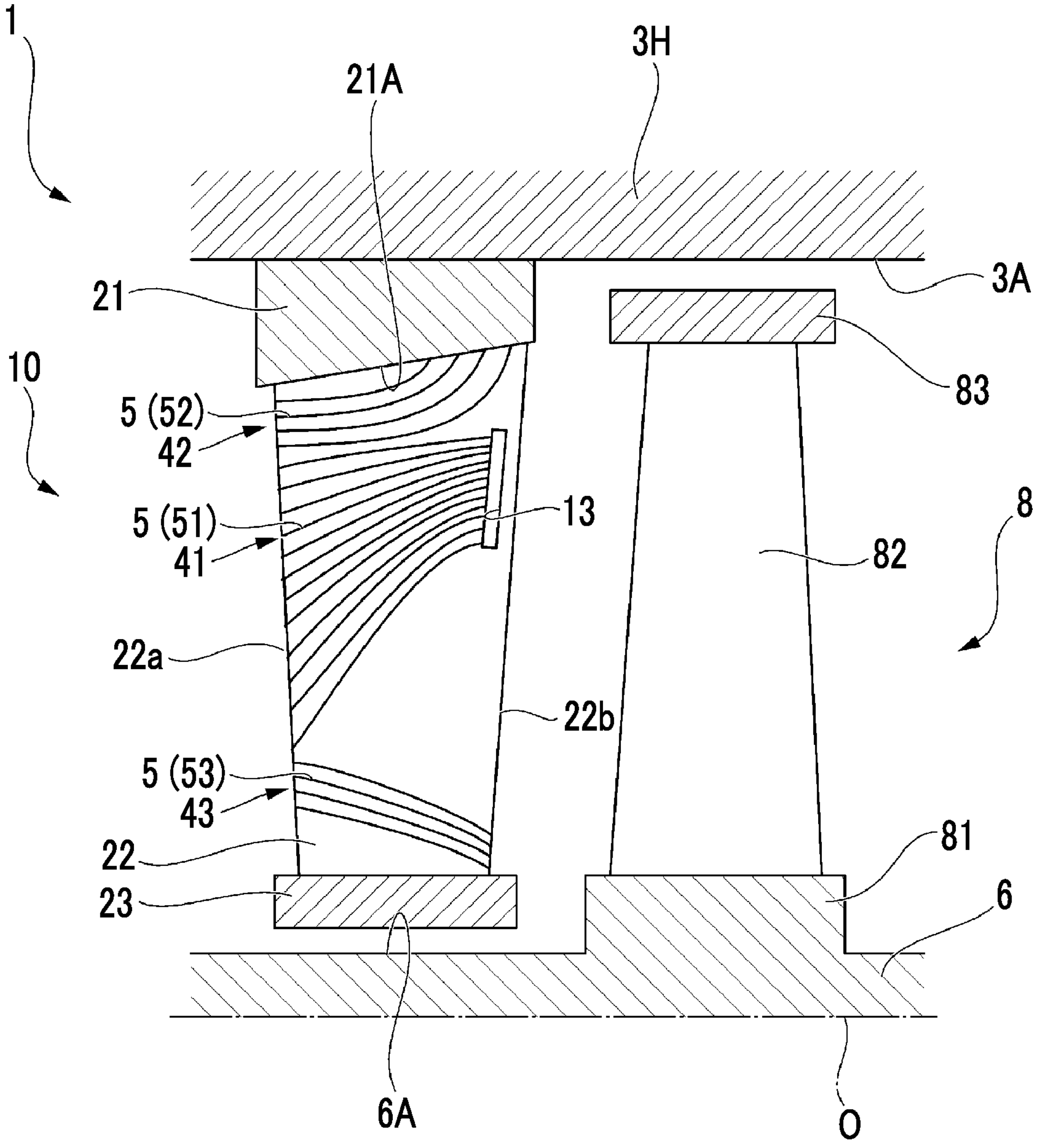
FIG. 2 is an enlarged cross-sectional view of a main part of the steam turbine according to the embodiment of the present disclosure.

As shown in FIG. 2, the rotor blade 8 includes a platform 81, a rotor blade body 82, and a shroud 83. The platform 81 is installed on the outer peripheral surface of the rotating shaft 6 (rotating shaft outer peripheral surface 6A). The rotor blade body 82 is provided on an outer peripheral side of the platform 81. The rotor blade body 82 extends in the radial direction and has a blade-shaped cross-sectional shape when viewed in the radial direction. As an example, the rotor blade body 82 is formed so that a dimension in the axis O direction gradually decreases from an inner side to an outer side in the radial direction. The shroud 83 is provided at an end portion on a radially outer side of the rotor blade body 82. The shroud 83 has a substantially rectangular cross-sectional shape having the axis O direction as a longitudinal direction. An outer peripheral surface of the shroud 83 faces an inner peripheral surface (casing inner peripheral surface 3A) of the casing body 3H at an interval in the radial direction.

Configuration of Stator Blade

The stator blade 10 has the outer ring 21, a stator blade body 22 (blade body), and the inner ring 23. In addition, the stator blade body 22 has a central region 41, an outer region 42, an inner region 43, and a slit 13 (collecting portion 14). The outer ring 21 has an annular shape centered on the axis O. The outer ring 21 is supported by the casing body 3H via a support member (not shown). The stator blade body 22 is fixed between the outer ring 21 and the inner ring 23. The stator blade body 22 extends radially inward from an outer ring inner peripheral surface 21A and has a blade-shaped cross-sectional shape when viewed in the radial direction. That is, the stator blade body 22 extends in a direction intersecting the flow direction of the steam. As an example, a dimension of the stator blade body 22 in the axis O direction gradually decreases from the outer side to the inner side in the radial direction. The inner ring 23 is provided at an end portion on a radially inner side of the stator blade body 22. The inner ring 23 has a substantially rectangular cross-sectional shape having the axis O direction as a longitudinal direction. An inner peripheral surface of the inner ring 23 faces the rotating shaft outer peripheral surface 6A at an interval in the radial direction.

The central region 41, the outer region 42, the inner region 43, and the slit 13 are formed on a surface of the stator blade body 22 (more specifically, a surface facing the upstream side of both surfaces of the stator blade body 22 in a thickness direction: a pressure side). A plurality of fine grooves 5 recessed inward from the surface of the stator blade body 22 are formed in the central region 41, the outer region 42, and the inner region 43. The fine grooves 5 are provided to transfer droplets generated on the surface of the stator blade body 22 to the downstream side along a flow of the steam. The fine grooves 5 are arranged at intervals in the radial direction.

Regarding the fine grooves 5 (first fine grooves 51) formed in the central region 41, intervals between the first fine grooves 51 adjacent to each other decrease from a leading edge 22*a* side to a trailing edge 22*b* side of the stator blade body 22. That is, a dimension of the central region 41 gradually decreases in the radial direction from the leading edge 22*a* side toward the trailing edge 22*b* side. End portions of the first fine grooves 51 on the downstream side communicate with the slit 13 described later.

The outer region 42 is formed radially outward of the central region 41. The fine grooves 5 (second fine grooves 52) formed in the outer region 42 are curved toward the outer side in the radial direction from the leading edge 22*a* side toward the downstream side. End portion of the second fine grooves 52 on the downstream side are connected to the inner peripheral surface of the outer ring 21.

The inner region 43 is formed radially inward of the central region 41. The fine grooves 5 (third fine grooves 53) formed in the inner region 43 are curved toward the inner side in the radial direction from the leading edge 22*a* side toward the downstream side. End portion of the third fine grooves 53 on the downstream side extend to a radially inner region (vicinity of the inner ring 23) in the trailing edge 22*b*.

On the leading edge 22*a* side, the central region 41 (first fine grooves 51) occupies the largest ratio, and the outer region 42 and the inner region 43 occupy a smaller area than the central region 41.

On a trailing edge 22*b* side of the central region 41, the slit 13 is formed as a collecting portion 14 for collecting a liquid film that has flowed through the first fine grooves 51. The slit 13 extends along the trailing edge 22*b*. The slit 13 is one or more elongated holes communicating with an inside of the stator blade body 22. That is, the stator blade body 22 is hollow. It is desirable that an internal space of the stator blade body 22 is brought into a negative pressure state by a device (not shown).

Figure 3:
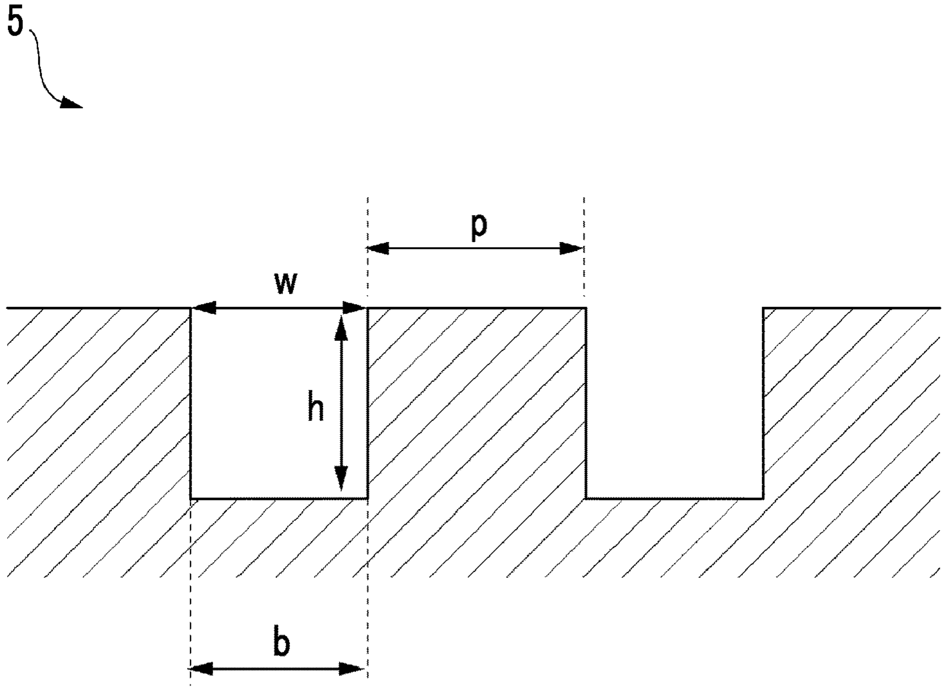
FIG. 3 is a cross-sectional view showing a shape of fine grooves according to the embodiment of the present disclosure.

Next, dimensions of the fine grooves 5 will be described with reference to FIG. 3. As shown in the figure, in the present embodiment, the fine groove 5 has a rectangular cross-sectional shape. In a case where the interval (pitch) between the adjacent fine groove 5 is p, a depth of the fine groove 5 is h, a width of an opening is w, and a width of a bottom surface part is b, it is desirable that a value of w is 0.3 to 2.0 mm. In addition, it is desirable that a value of b/w is 0 to 2.0 (although details will be described later, a case where the value is 0 corresponds to a case where the fine groove 5 has a triangular cross section). Furthermore, it is desirable that a value of h/w is 0.5 to 2.0. A value of p/w is desirably 0.5 to 3.0.

Actions and Effects

Subsequently, an operation of the steam turbine 1 and a behavior of the droplets on the stator blade 10 according to the present embodiment will be described. In operating the steam turbine 1, first, high-temperature and high-pressure steam is introduced into an inside of the casing body 3H through the steam flow path 11. The steam alternately passes through the above-described stator blade rows 9 and rotor blade rows 7 while flowing toward the downstream side inside the casing body 3H. The stator blade row 9 rectifies the flow of the steam to cause the steam to flow into the adjacent rotor blade row 7 on the downstream side. By the steam acting on the rotor blade row 7, torque is applied to the rotating shaft 6 through the rotor blade row 7. Due to this torque, the rotor 2 rotates around the axis O. Rotational energy of the rotor 2 is taken out from a shaft end and is used for driving a generator (not shown) or the like.

Here, energy of the steam passing through the stage in a main flow path of the turbine is converted into rotational energy each time the steam passes through the stage from the upstream side toward the downstream side, resulting in a decrease in temperature (and pressure). Therefore, in the stator blade row 9 on the most downstream side, a portion of the steam is liquefied and exists in an air flow as fine droplets, and a portion of the droplets adheres to the surface of the stator blade 10 (the stator blade body 22). These droplets grow to form a liquid film. Furthermore, when the liquid film flows downstream and increases in thickness as the number of droplets continues to increase, a portion of the liquid film is torn off by the steam flow, or the liquid film that remains adhering to the stator blade row scatters as coarse droplets from the trailing edge of the stator blade. The scattering droplets flow toward the downstream side while gradually accelerating due to the steam flow. When the coarse droplets collide with the rotor blade 8 on the downstream side, erosion may occur on a surface of the rotor blade 8. In addition, the collision of the droplets may hinder rotation of the rotor blade 8 (rotor 2), resulting in braking loss.

Therefore, in the present embodiment, the plurality of fine grooves 5 are formed on the surface of the stator blade body 22 as described above. The droplets captured in the fine grooves 5 flow toward the downstream side along with the flow of the steam. In the central region 41, the droplets flow toward the slit 13 along the first fine grooves 51. The droplets are collected by a negative pressure of the slit 13. In addition, in the outer region 42, the droplets flow toward the outer side in the radial direction along the second fine grooves 52 and are guided to the inner peripheral surface of the outer ring 21. That is, the droplets do not reach the rotor blade 8 on the downstream side. Similarly, in the inner region 43, the droplets flow toward the inner side in the radial direction along the third fine grooves 53. Accordingly, the droplets do not reach a tip portion of the rotor blade 8 having a high circumferential speed.

In particular, according to the above configuration, the intervals between the first fine grooves 51 decrease from the upstream side toward the collecting portion 14 (slit 13). Accordingly, the liquid film or droplets can be guided toward the collecting portion 14 from a wider range on the upstream side. In addition, accordingly, a size of the collecting portion 14 itself can be minimized. As a result, a possibility that the collecting portion 14 affects a mainstream of the steam can be reduced compared to a case where a large collecting portion 14 is secured.

In addition, according to the above configuration, the liquid film generated on the outer side in the radial direction from the central region 41 can be further guided toward the outer side in the radial direction (for example, the inner peripheral surface of the outer ring 21) by the second fine grooves 52. Accordingly, a possibility that the droplets are scattered toward a downstream side of the stator blade body 22 can be further reduced.

Furthermore, according to the above configuration, the liquid film generated on the inner side in the radial direction from the central region 41 can be further guided toward the inner side in the radial direction by the third fine grooves 53. Accordingly, the possibility that the droplets are scattered toward the downstream side of the stator blade body 22 can be further reduced.

Other Embodiments

Hereinabove, the embodiment of the present disclosure has been described. In addition, various changes and modifications of the above-described configuration can be made without departing from the gist of the present disclosure.

Figure 4:
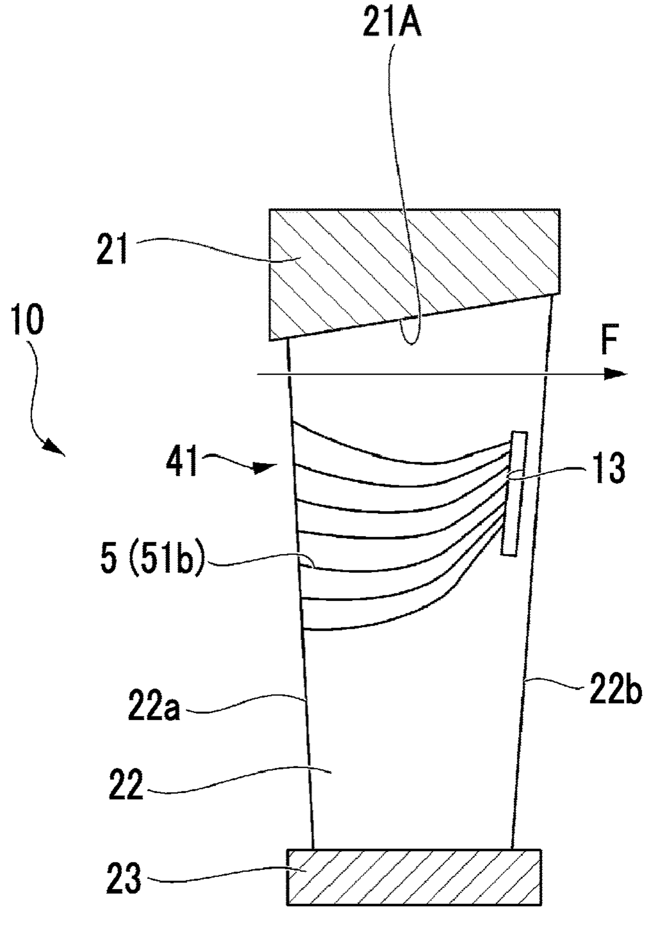
FIG. 4 is a view showing a first modification example of a turbine stator blade according to the embodiment of the present disclosure.

For example, a configuration shown in FIG. 4 can be adopted as a first modification example of the stator blade 10. In the first modification example, first fine grooves 51*b* are curved toward the outer side in the radial direction from the leading edge 22*a* side toward the slit 13 side. Furthermore, a turning angle, which is an angle formed by a direction in which the first fine grooves 51*b* extend with respect to a flow direction F of the steam, gradually decreases toward the slit 13. That is, a portion of the first fine grooves 51*b* on the slit 13 side has a larger radius of curvature than a portion of the first fine grooves 51*b* on the leading edge 22*a* side. In other words, a rate of increase in the turning angle gradually decreases from the leading edge 22*a* side toward the slit 13 side. It is also possible to form the portion of the first fine grooves 51*b* on the slit 13 side as a clothoid curve.

According to the above configuration, the direction in which the first fine grooves 51*b* extend changes along the flow direction of the steam toward the slit 13. Accordingly, a flow velocity of the liquid film increases toward the slit 13, and the liquid film can be collected more efficiently.

Figure 5:
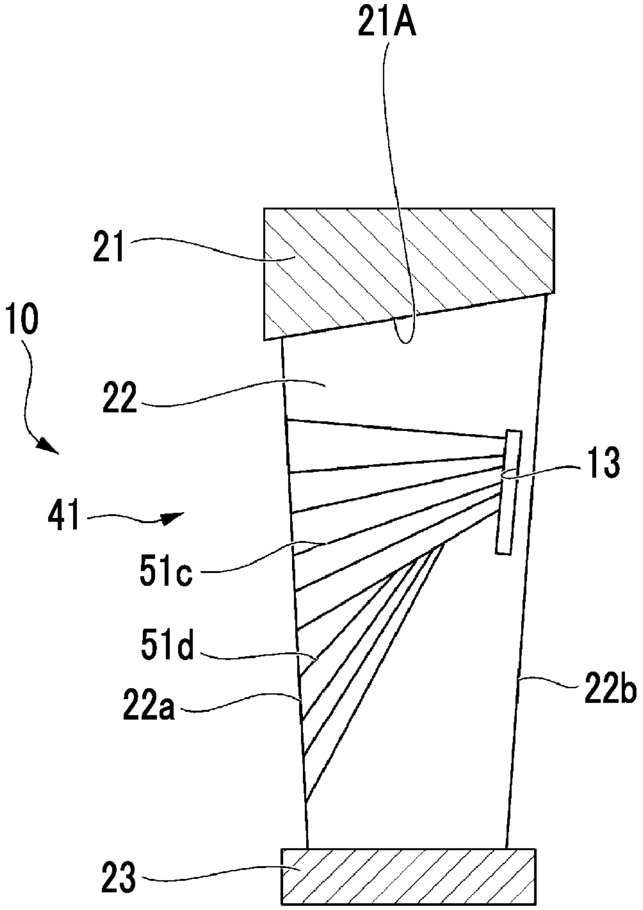
FIG. 5 is a view showing a second modification example of the turbine stator blade according to the embodiment of the present disclosure.

Furthermore, it is also possible to adopt a configuration shown in FIG. 5 as a second modification example of the stator blade 10. In the second modification example, main grooves 51*c* and sub-grooves 51*d* are formed as the fine grooves 5 in the central region 41. The main grooves 51*c* extend from the leading edge 22*a* side toward the slit 13, and an interval between the main grooves 51*c* adjacent to each other decreases. The sub-grooves 51*d* join one of the main grooves 51*c* at an end point starting from the leading edge 22*a* side. Even with such a configuration, it is possible to collect the liquid film in a wider range on the leading edge 22*a* side.

Figure 6:
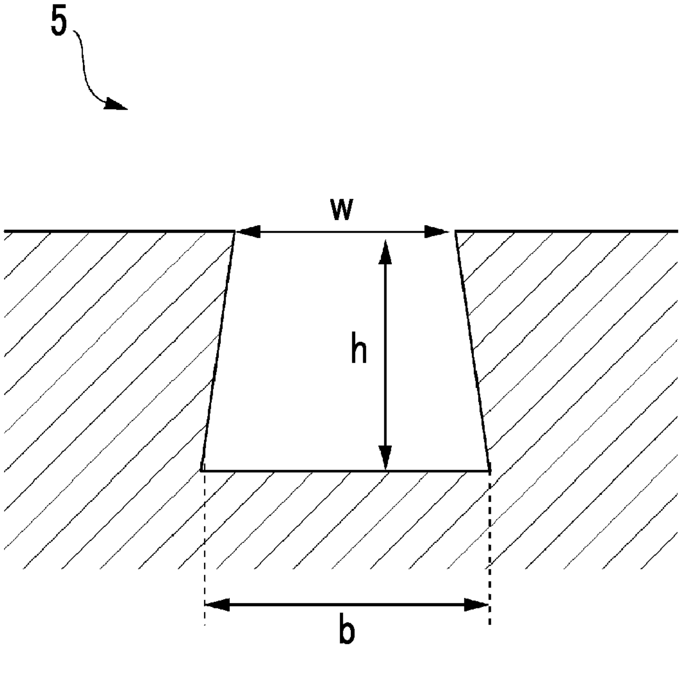
FIG. 6 is a cross-sectional view showing a first modification example of the fine grooves according to the embodiment of the present disclosure.
Figure 7:
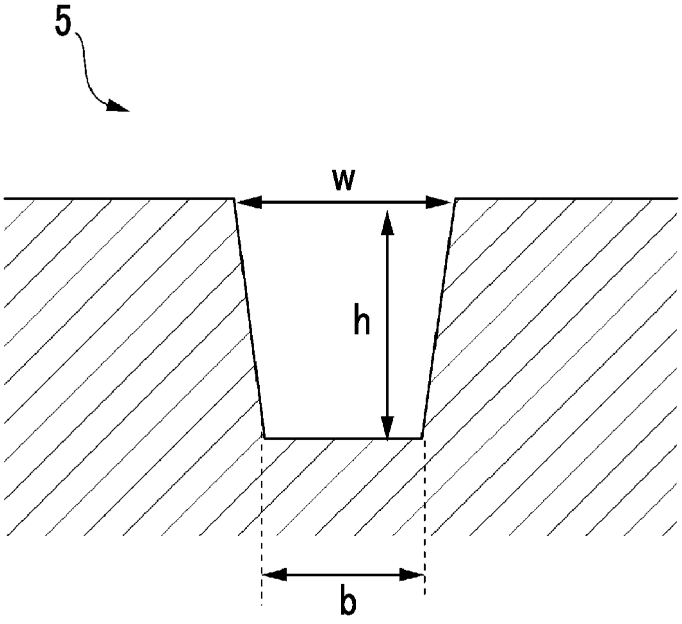
FIG. 7 is a cross-sectional view showing a second modification example of the fine grooves according to the embodiment of the present disclosure.
Figure 8:
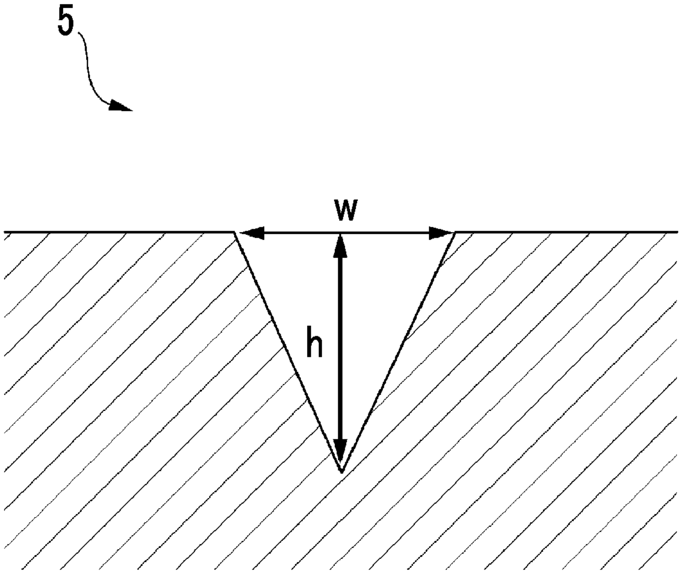
FIG. 8 is a cross-sectional view showing a third modification example of the fine grooves according to the embodiment of the present disclosure.
Figure 9:
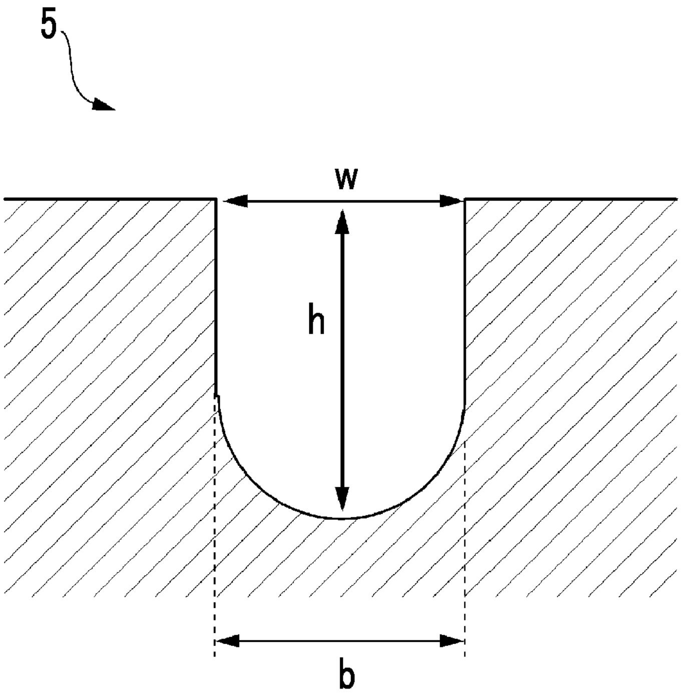
FIG. 9 is a cross-sectional view showing a fourth modification example of the fine grooves according to the embodiment of the present disclosure.

In addition, in the above-described embodiment, the example in which the fine groove 5 has a rectangular cross-sectional shape has been described. However, the shape of the fine groove 5 can be variously changed as long as the above-mentioned dimensional conditions are satisfied. For example, as shown in FIG. 6, the width b of the bottom surface part can also be made larger than the width w of the opening (b>w). As shown in FIG. 7, the width b of the bottom surface part can also be made smaller than the width w of the opening (b<w). As shown in FIG. 8, the cross-sectional shape of the fine groove 5 can be made triangular (b=0). Furthermore, as shown in FIG. 9, the bottom surface part can be made in an arc shape.

Additional Notes

A device X described in each embodiment is grasped as follows, for example.

(1) The turbine stator blade (stator blade 10) according to a first aspect includes: the stator blade body 22 extending in the radial direction intersecting the flow direction of the steam; the collecting portion 14 formed on the surface of the stator blade body 22 and collecting the liquid film flowing along the surface; and the central region 41 formed on the surface of the stator blade body 22 and formed with the plurality of first fine grooves 51 extending from the upstream side in the flow direction toward the collecting portion 14, in which the intervals between the first fine grooves 51 adjacent to each other decrease from the upstream side toward the collecting portion 14.

According to the above configuration, the intervals between the first fine grooves 51 decrease from the upstream side toward the collecting portion 14. Accordingly, the liquid film can be guided toward the collecting portion 14 from a wider range on the upstream side. In addition, the size of the collecting portion 14 itself can be minimized. Accordingly, the possibility that the steam affects the mainstream of the steam can be reduced.

(2) In the turbine stator blade (stator blade 10) according to a second aspect, the turning angle, which is the angle formed by the direction in which the first fine grooves 51*b* extend with respect to the flow direction, may gradually decrease toward the collecting portion 14.

According to the above configuration, the direction in which the first fine grooves 51*b* extend changes along the flow direction of the steam toward the collecting portion 14. Accordingly, the flow velocity of the liquid film increases toward the collecting portion 14, and the liquid film can be collected more efficiently.

(3) In the turbine stator blade (stator blade 10) according to a third aspect, a rate of increase in the turning angle, which is the angle formed by the direction in which the first fine grooves 51*b* extend with respect to the flow direction, may gradually decrease toward the collecting portion 14.

According to the above configuration, the rate of increase in the turning angle of the first fine grooves 51*b* gradually decreases toward the collecting portion 14. Accordingly, the flow velocity of the liquid film increases toward the collecting portion 14, and the liquid film can be collected more efficiently.

(4) The turbine stator blade (stator blade 10) according to a fourth aspect may further include: the outer region 42 formed radially outward of the central region 41 on the surface of the stator blade body 22 and formed with a plurality of the second fine grooves 52 extending radially outward from the upstream side toward the downstream side.

According to the above configuration, the liquid film generated on the outer side in the radial direction from the central region 41 can be further guided toward the outer side in the radial direction (for example, the inner peripheral surface of the outer ring 21) by the second fine grooves 52. Accordingly, the possibility that the droplets are scattered toward the downstream side of the stator blade body 22 can be further reduced.

(5) The turbine stator blade (stator blade 10) according to a fifth aspect may further include: the inner region 43 formed radially inward of the central region 41 on the surface of the stator blade body 22 and formed with a plurality of the third fine grooves 53 extending radially inward from the upstream side toward the downstream side.

According to the above configuration, the liquid film generated on the inner side in the radial direction from the central region 41 can be further guided toward the inner side in the radial direction by the third fine grooves 53. Accordingly, the possibility that the droplets are scattered toward the downstream side of the stator blade body 22 can be further reduced.

(6) The steam turbine 1 according to a sixth aspect includes: the rotating shaft 6 extending along the axis O; a plurality of the turbine rotor blades (rotor blades 8) extending radially outward from the outer peripheral surface of the rotating shaft 6 and arranged in the circumferential direction; the casing 3 that covers the rotating shaft 6 and the plurality of turbine rotor blades from the outer side; and a plurality of the turbine stator blades (stator blades 10) according to any one of the first to fifth aspects, extending radially inward from the inner peripheral surface of the casing 3 and arranged in the circumferential direction.

According to the above configuration, it is possible to provide the steam turbine 1 in which generation of erosion due to the droplets being scattered toward the downstream side is suppressed.

INDUSTRIAL APPLICABILITY

According to the present disclosure, it is possible to provide a turbine stator blade and a steam turbine capable of suppressing or collecting droplets more efficiently.

REFERENCE SIGNS LIST

1: Steam turbine
2: Rotor
3: Casing
3A: Casing inner peripheral surface
3H: Casing body
5: Fine groove
6: Rotating shaft
6A: Rotating shaft outer peripheral surface
7: Rotor blade row
8: Rotor blade (turbine rotor blade)
9: Stator blade row
10: Stator blade (turbine stator blade)
11: Steam flow path
12: Exhaust hood
13: Slit
14: Collecting portion
21: Outer ring
21A: Outer ring inner peripheral surface
22: Stator blade body (blade body)
22*a*: Front edge
22*b*: Trailing edge
23: Inner ring
41: Central region
42: Outer region
43: Inner region
51,51*b*: First fine groove
51*c*: Main groove
51*d*: Sub-groove
52: Second fine groove
53: Third fine groove
81: Platform
82: Rotor blade body
83: Shroud
O: Axis

The invention claimed is:

1. A turbine stator blade comprising:
a stator blade body extending in a radial direction intersecting a flow direction of steam;
a collecting portion defined on a surface of the stator blade body and configured to collect a liquid film flowing along the surface of the stator blade body; and
a central region defined on the surface of the stator blade body and including grooves extending from an upstream side in the flow direction toward the collecting portion,
wherein:
intervals between the grooves that are adjacent to each other decrease from the upstream side toward the collecting portion; and
a turning angle, which is an angle defined by a direction in which the grooves extend with respect to the flow direction, decreases toward the collecting portion.

2. The turbine stator blade according to claim 1,
wherein a rate of increase in the turning angle decreases toward the collecting portion.

3. The turbine stator blade according to claim 2, wherein the rate of increase in the turning angle gradually decreases toward the collecting portion.

4. The turbine stator blade according to claim 1, wherein:
the grooves are first grooves; and
the turbine stator blade further comprises an outer region which is radially outward of the central region on the surface of the stator blade body and includes second grooves extending radially outward from the upstream side toward a downstream side.

5. The turbine stator blade according to claim 4, a width of an opening of each of the second grooves is 0.3 mm to 2.0 mm.

6. The turbine stator blade according to claim 1, wherein:
the grooves are first grooves; and
the turbine stator blade further comprises an inner region which is radially inward of the central region on the surface of the stator blade body and includes third grooves extending radially inward from the upstream side toward a downstream side.

7. The turbine stator blade according to claim 6, a width of an opening of each of the third grooves is 0.3 mm to 2.0 mm.

8. A steam turbine comprising:
a rotatable shaft extending along an axis;
a plurality of turbine rotor blades extending radially outward from an outer peripheral surface of the rotatable shaft and arranged in a circumferential direction;
a casing that covers the rotatable shaft and the plurality of turbine rotor blades from an outer side; and
a plurality of the turbine stator blades according to claim 1, extending radially inward from an inner peripheral surface of the casing and arranged in the circumferential direction.

9. The turbine stator blade according to claim 1, wherein the turning angle gradually decreases toward the collecting portion.

10. The turbine stator blade according to claim 1, a width of an opening of each of the grooves is 0.3 mm to 2.0 mm.

* * * * *